United States Patent [19]

Muratsubaki

[11] 4,307,754
[45] Dec. 29, 1981

[54] FLEXIBLE PIPE
[75] Inventor: Masaaki Muratsubaki, Tokyo, Japan
[73] Assignee: Miyako Gomu Kogyo Kabushiki Kaisha, Tokyo, Japan
[21] Appl. No.: 38,298
[22] Filed: May 11, 1979
[30] Foreign Application Priority Data Aug. 23, 1978 [JP] Japan .......................... 53-115369[U]

[51] Int. Cl.³ ............................................. F16L 11/12
[52] U.S. Cl. .................................... 138/108; 138/103; 138/109; 138/118; 138/121; 138/172; 138/178; 138/DIG. 8
[58] Field of Search ............... 138/103, 108, 121, 122, 138/109, 131, 172, 178, DIG. 8, 118

[56] References Cited
U.S. PATENT DOCUMENTS

| 220,954 | 10/1879 | Atterbury | 138/108 X |
| 314,440 | 3/1885 | Eames | 138/122 X |
| 2,299,160 | 10/1942 | Mac Pherson | 138/172 |
| 2,640,502 | 6/1953 | Powers | 138/103 X |
| 2,759,765 | 8/1956 | Pawley | 138/DIG. 8 |
| 2,905,194 | 9/1959 | Smuth et al. | 138/178 X |

FOREIGN PATENT DOCUMENTS 976640 12/1964 United Kingdom ............... 138/118

Primary Examiner—James E. Bryant, III
Attorney, Agent, or Firm—Wenderoth, Lind & Ponack

[57] ABSTRACT

A flexible pipe includes an elastic pipe body in corrugated form and including alternate large and small radius portions. A ring is mounted within one of the large diameter portions of the interior of the pipe body. An elongated flexible and deformable shaping member is secured to the ring and extends throughout the interior length of the tube body.

7 Claims, 5 Drawing Figures

FLEXIBLE PIPE

BACKGROUND OF THE INVENTION

The present invention relates to a flexible pipe which can maintain itself at any bent position and particularly relates to such a hose which is used as a radiator hose which connects the engine and the radiator of a car.

Conventional radiator hoses are shaped with a predetermined bend so that they do not have to be substantially bent between the engine and the radiator when they are placed around auxiliary machinery of the engine without being in contact therewith. When a conventional radiator hose is to be replaced by a new hose, the new hose has to have exactly the same shape as the old hose, and in garages and stores many different kinds of radiators and hoses have to be stored, thus presenting the disadvantage that management of car parts becomes quite complicated.

Also, conventional flexible pipes include corrugated pipes which are formed from an elastic material such as rubber. However, since this type of pipe does not have the ability to maintain itself in a bent position, it is necessary to secure the middle part of the pipe to some securing member by suitable hose bands, thus again presenting the drawback that the scope of usage of the pipe is limited.

BRIEF SUMMARY OF THE INVENTION

The object of the present invention is to provide a flexible pipe which can be easily bent and which can maintain bent positions, thus overcoming the above-mentioned disadvantages so as to simplify the management of stored parts and to improve the mountability of such pipes.

This object is achieved in accordance with the present invention by the provision of a flexible pipe including an elongated pipe body formed of an elastic material and capable of being bent into a desired configuration. A ring is mounted within the interior of the pipe body. An elongated shaping device is secured to the ring and extends along the interior of the pipe body throughout substantially the entire length thereof. The shaping device maintains a desired bent configuration of the pipe body.

Preferably, the shaping device is formed of a flexible deformable material, such as aluminum, steel or stainless steel which can be bent or deformed into a desired shape and which will retain such desired shape until bent into a new desired shape.

In accordance with one aspect of the present invention, the shaping device may include plural elongated rods which extend through openings in the ring. In accordance with another aspect of the present invetnion, the shaping device may include an elongated wire or rod formed into an elongated U-shaped member. The member is then twisted throughout the length thereof except for free end portions which are formed as hooks to extend through openings in the ring.

In accordance with a further feature of the present invention, the pipe body is corrugated and includes alternate large radius portions and small radius portions, and the ring is mounted within one of the large radius portions, preferably adjacent one of the ends of the pipe body. Further, the shaping device is secured to the ring at positions radially inwardly of the inner radius portions of the small radius portions of the corrugated pipe body.

BRIEF DESCRIPTION OF THE DRAWINGS

Other objects, features and advantages of the present invention will be apparent from the following detailed description, taken with the accompanying drawings, wherein.

DETAILED DESCRIPTION OF THE INVENTION

The invention will now be explained in detail, reference being made to the embodiment shown in the attached drawings.

Figure 1:
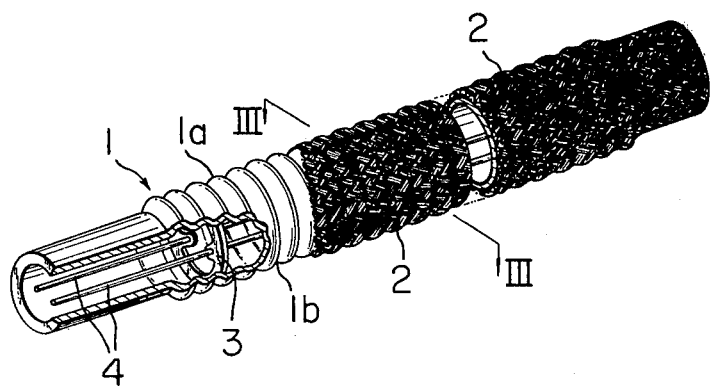
FIG. 1 is a partially cutaway perspective view showing one embodiment of the present invention.
Figure 2:
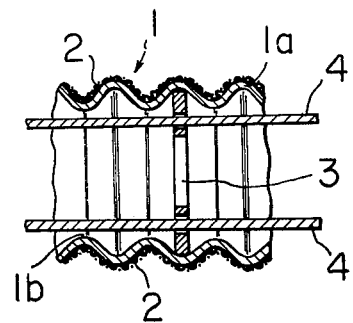
FIG. 2 is an enlarged longitudinal section of a part of the hose of the embodiment of FIG. 1

FIGS. 1 and 2 show an embodiment of a flexible pipe or hose in accordance with the present invention. A flexible pipe body 1 is corrugated and includes alternate large radius parts 1a and small radius parts 1b. The pipe body is open at both ends and is formed from an elastic material such as ethylene, polypropylene, or polymer which has excellent head and weather resistance and durability. A coating 2 covers the outer surface of the pipe body 1 and is composed, for example, from cotton thread alone or from cotton thread and steel wire arranged like a cloth so as to improve the pressure resistance of the pipe body 1, as well as to protect the outer surface thereof and to improve its durability.

A ring 3 is inserted into one or more of the large radius parts 1a of the pipe body. Ring or rings 3 have extending therethrough shaping members 4 at positions more inwardly than the small radius parts 1b. Shaping members 4 extend along the length of the pipe body 1. The shaping members are composed of a flexible material such as aluminum, steel or stainless steel which can be easily bent into a desired shape at regular temperatures, such that the shaping members, and thus the pipe body, will retain such desired shape until bent to a new desired shape.

Figure 3:
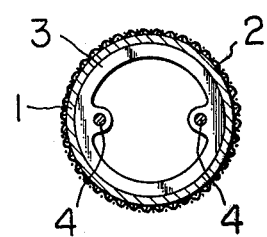
FIG. 3 is a cross-sectional view taken on line III—III of FIG. 1.
Figure 4:
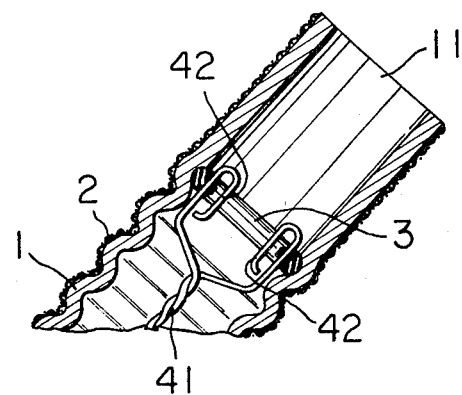
FIG. 4 is a partial longitudinal cross-sectional view showing the relationship of the shaping member and the ring, but of another embodiment.
Figure 5:
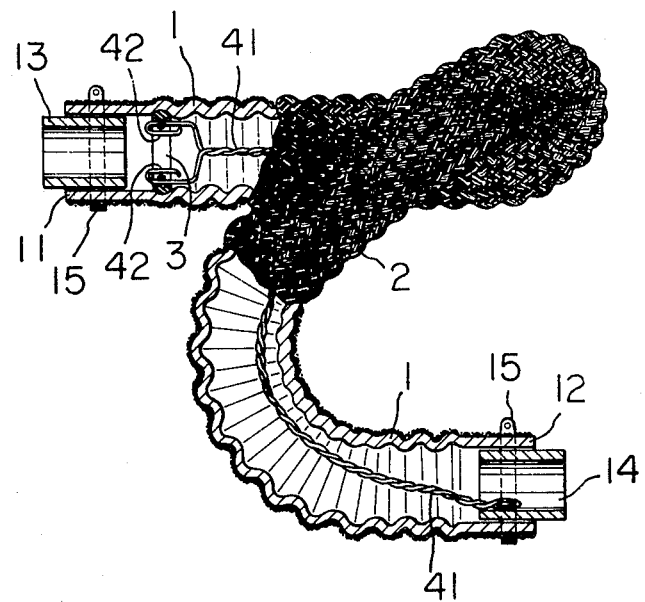
FIG. 5 is a perspective view, partially in section, showing conditions of use of the flexible pipe of the embodiment of FIG. 4 when employed as a radiator hose.

In the embodiment shown in FIGS. 1 through 3, two rod-like shaping members 4 are employed. However, more than two shaping members may be employed. Also, depending on the size of the diameter of the pipe body and the place in which the hose is to be used, as shown in FIGS. 4 and 5, it is possible to form a single wire, of a flexible material as indicated above, into a single elongated U-shaped member, and to then twine or twist such member throughout substantially its entire length to thus form a single shaping member 41, leaving only a required length at open ends 42 untwisted. The shaping member 41 is secured to the ring 3 by bending the ends 42 in the form of hooks and inserting them through holes (not numbered) provided in the ring, as shown in FIGS. 4 and 5.

The flexible pipe or hose composed as described above is designed to be used by bending it horizontally or vertically as desired, and when it is to be used as a radiator hose, one open end 11 of the hose is positioned at a radiator tube or mouth 13 and is secured thereto by a clamp band 15, while the other open end 12 is positioned at an engine tube or mouth 14 and is secured thereto in the same manner by a clamp band 15. It is needless to say that the flexible pipe or hose is to be secured in such a manner that it does not touch the engine body, the belt or the fan. After the hose is secured, one should start the engine to check up if there is any water leakage and that the hose is not in contact with the engine, the belt and the fan, etc.

Thus, according to the present invention in which at least one flexible and deformable shaping member is provided inside a pipe body which can be bent in any desired shape, and more particularly, in which such member or members are mounted on a ring provided inside the pipe body, the flexible pipe or hose cannot only be bent in any desired shape and maintain itself in such bent shape, but also the shaping members do not come off or move from the inside of the pipe or hose during its actual usage.

Moreover, since the pipe or hose can be bent into any desired shape at any time and can maintain such shape, it is no longer necessary to prepare and store a great number of different rubber hoses having different predetermined shapes, as was previously necessary. This contributes to the simplification of parts management and mountability of the hoses.

Although preferred embodiments of the invention have been described and illustrated in detail, it will be apparent that various modifications can be made without departing from the scope of the invention.

What is claimed is:

1. A flexible pipe comprising:
    an elongated pipe body formed of an elastic material and capable of being bent into a desired configuration;
    a ring mounted within the interior of said pipe body at a position intermediate the ends of said pipe body;
    elongated shaping means, separate from said ring and secured to said ring and extending along the interior of said pipe body throughout substantially the entire length thereof, for maintaining a desired bent configuration of said pipe body; and
    wherein said shaping means comprises a wire formed into an elongated U-shaped member twisted throughout the length thereof except for free end portions thereof, said free end portions being formed as hooks extending through said ring.

2. A flexible pipe as claimed in claim 1, wherein said pipe body is corrugated and includes alternate large radius portions and small radius portions, and said ring is mounted within one of said large radius portions.

3. A flexible pipe as claimed in claim 2, wherein said shaping means is secured to said ring at positions radially inwardly of the inner radius portions of said small radius portions.

4. A flexible pipe comprising:
    an elongated pipe body formed of an elastic material and capable of being bent into a desired configuration;
    a ring mounted within the interior of said pipe body; and
    elongated shaping means, secured to said ring and extending along the interior of said pipe body throughout substantially the entire length thereof, for maintaining a desired bent configuration of said pipe body, said shaping means comprising a wire formed into an elongated U-shaped member twisted throughout the length thereof except for free end portions thereof, said free end portions being formed as hooks extending through said ring.

5. A flexible pipe as claimed in claim 4, wherein said wire is formed of a flexible, deformable material.

6. A flexible pipe as claimed in claim 4, wherein said pipe body is corrugated and includes alternate large radius portions and small radius portions, and said ring is mounted within one of said large radius portions.

7. A flexible pipe as claimed in claim 6, wherein said hooks are secured to said ring at positions radially inwardly of the inner radius portions of said small radius portions.

* * * * *